United States Patent
Doi et al.

(10) Patent No.: US 7,879,246 B2
(45) Date of Patent: Feb. 1, 2011

(54) WATER TREATMENT APPARATUS

(75) Inventors: Yukio Doi, Chiryu (JP); Koichi Matsuo, Chiryu (JP); Yosuke Tabata, Chiryu (JP); Toshiyuki Iwama, Chiryu (JP); Yoichiro Shimizu, Chiryu (JP)

(73) Assignee: Fuji Clean Co., Ltd, Nagoya-shi, Aichi (JP)

( * ) Notice: Subject to any disclaimer, the term of this patent is extended or adjusted under 35 U.S.C. 154(b) by 1396 days.

(21) Appl. No.: 11/348,548

(22) Filed: Feb. 7, 2006

(65) Prior Publication Data

US 2006/0177555 A1      Aug. 10, 2006

(30) Foreign Application Priority Data

Feb. 9, 2005    (JP)    ............... 2005-033130

(51) Int. Cl.
- *C02F 1/00* (2006.01)
- *C02F 1/32* (2006.01)
- *C02F 1/46* (2006.01)
- *C02F 1/76* (2006.01)
- *C02F 1/78* (2006.01)
- *C02F 9/00* (2006.01)

(52) U.S. Cl. ............. 210/739; 210/743; 210/748.01; 210/748.11; 210/754; 210/756; 210/760; 210/93; 210/170.08; 210/172.1; 210/198.1; 210/260

(58) Field of Classification Search ............ 210/170.08, 210/260, 93, 95, 172.1, 745, 94, 743, 748.11, 210/756; 422/82.09
See application file for complete search history.

(56) References Cited

U.S. PATENT DOCUMENTS

| | | | |
|---|---|---|---|
| 5,053,140 A * | 10/1991 | Hurst | 210/704 |
| 5,683,576 A * | 11/1997 | Olsen | 210/138 |
| 5,828,458 A * | 10/1998 | Taylor et al. | 356/440 |
| 6,312,588 B1 * | 11/2001 | Conrad et al. | 210/85 |
| 6,383,369 B2 * | 5/2002 | Elston | 210/86 |
| 2003/0205509 A1 * | 11/2003 | Barnes et al. | 210/85 |

FOREIGN PATENT DOCUMENTS

JP    03052696    3/1991

OTHER PUBLICATIONS

WO 2006/011241, Okamoto, Waste Water Purification Apparatus, WIPO, Feb. 2, 2006.*
WO 2006/011241 English translation from EPO.*

* cited by examiner

*Primary Examiner*—Duane Smith
*Assistant Examiner*—Paul J Durand
(74) *Attorney, Agent, or Firm*—Dennison, Schultz & MacDonald

(57) ABSTRACT

It is an object of the present invention to provide an effective technique for achieving a higher level of water quality control in a water treatment apparatus. Representative water treatment apparatus according to the present invention may include a purifying section, a sterilizing section, a water storing section and a water quality detection sensor. The water quality detection sensor is immersed in the water storing section. The water quality detection sensor not only serves as a means for detecting the quality of water in the water storing section, but also as a means for detecting deposition of biomembrane on the detecting section of the water quality detection sensor due to deterioration of the sterilizing performance of the water storing section. As a result, an efficient water quality control system can be realized.

18 Claims, 6 Drawing Sheets

WATER TREATMENT APPARATUS

BACKGROUND OF THE INVENTION

1. Field of the Invention

The present invention relates to a water treatment apparatus, and more particularly, to a water treatment apparatus having a purifying section for purifying water to be treated and a sterilizing section for sterilizing the water that has been treated in the purifying section, and an effective technique for achieving an optimum water quality control using the same apparatus.

2. Description of the Related Art

In a known water treatment apparatus for domestic or industrial wastewater, a water quality detection sensor is used to keep track of the quality of water to be treated. For example, Japanese laid-open patent publication No. 3-52696 discloses a water treatment apparatus of this type. In this apparatus, a DO sensor is provided in an aeration tank disposed upstream of a sterilizing chamber. The DO sensor is employed to keep track of the quality of the aerated water. However, in such a water treatment apparatus in which a water quality detection sensor is disposed in a purification region such as an aeration tank, biomembrane may be deposited on the water quality detection sensor and such biomembrane inhibits accurate water quality detection.

SUMMARY OF THE INVENTION

It is, accordingly, an object of the present invention to provide an effective technique for achieving a higher level of water quality control in a water treatment apparatus.

A representative water treatment apparatus according to the present invention may include a purifying section, a sterilizing section, a water storing section and a water quality detection sensor. The purifying section is configured as a region for purifying water to be treated. The purification may be performed by appropriately employing solid-liquid separation, anaerobical treatment, aeration, aerobical treatment or other similar treatment. The sterilizing section is configured as a region for sterilizing the water that has been treated in the purifying section. The sterilization may be performed by appropriately employing chlorination, ozone sterilization, ultraviolet sterilization, electrolytic sterilization or other similar treatment.

The water storing section is configured as a region for storing the water that has been treated in the sterilizing section. The water storing section may comprise the sterilizing section in part or in entirety. Alternatively, the water storing section may be disposed downstream of the sterilizing section and configured as a different region from the sterilizing section. In this invention, the sterilized water is discharged from the water storing section to the outside of the water treatment apparatus.

The water quality detection sensor is immersed in the water storing section. Thus, the quality of the sterilized water to be discharged to the outside of the water treatment apparatus is detected. Preferably, the water quality detection sensor may optically detect the water quality by utilizing transparency or attenuation of light that goes through the water. As the water quality detection sensor, various kinds of sensors can be appropriately used to detect data relating to the water quality, such as turbidity, transparency, SS (suspended solids), BOD (biochemical oxygen demand), DO (dissolved oxygen), pH, and UV (ultraviolet) absorbance of the water, continuously or at fixed time intervals.

According to the invention, the water quality detection sensor not only serves as a means for detecting the quality of water in the water storing section, but also as a means for detecting deposition of biomembrane on the detecting section of the water quality detection sensor due to deterioration of the sterilizing performance of the water storing section. Specifically, if the sterilizing performance deteriorates, biomembrane is deposited on the detecting section of the water quality detection sensor, resulting in that the detected value of the water quality detection sensor falls outside the normal range. Therefore, by monitoring the detected data, it can be found that the sterilizing performance has deteriorated. For example, in the sterilizing chamber for performing chlorination, it can be found that the chlorinating agent has run out.

According to the invention, the water quality can be comprehensively controlled at a higher level. In other words, biomembrane deposition on the water quality detection sensor can be minimized by sterilization so that inhibition by biomembrane deposition against accurate water quality detection can be prevented. Further, with the construction in which the water quality detection sensor is used to detect the water quality within the water storing section and also to detect biomembrane deposition on the detecting section of the water quality detection sensor, an efficient water quality control system can be realized in which the water quality detection sensor is used for water quality control as a means for monitoring the water quality of the water storing section and also as a means for monitoring the sterilizing performance.

Other objects, features and advantages of the present invention will be readily understood after reading the following detailed description together with the accompanying drawings and the claims.

DETAILED DESCRIPTION OF THE INVENTION

Each of the additional features and method steps disclosed above and below may be utilized separately or in conjunction with other features and method steps to provide and manufacture improved waste water treatment apparatus and method for using such waste water treatment apparatus and devices utilized therein. Representative examples of the present invention, which examples utilized many of these additional features and method steps in conjunction, will now be described in detail with reference to the drawings. This detailed description is merely intended to teach a person skilled in the art further details for practicing preferred aspects of the present teachings and is not intended to limit the scope of the invention. Only the claims define the scope of the claimed invention. Therefore, combinations of features and steps disclosed within the following detailed description may not be necessary to practice the invention in the broadest sense, and are instead taught merely to particularly describe some representative examples of the invention, which detailed description will now be given with reference to the accompanying drawings.

Figure 1:
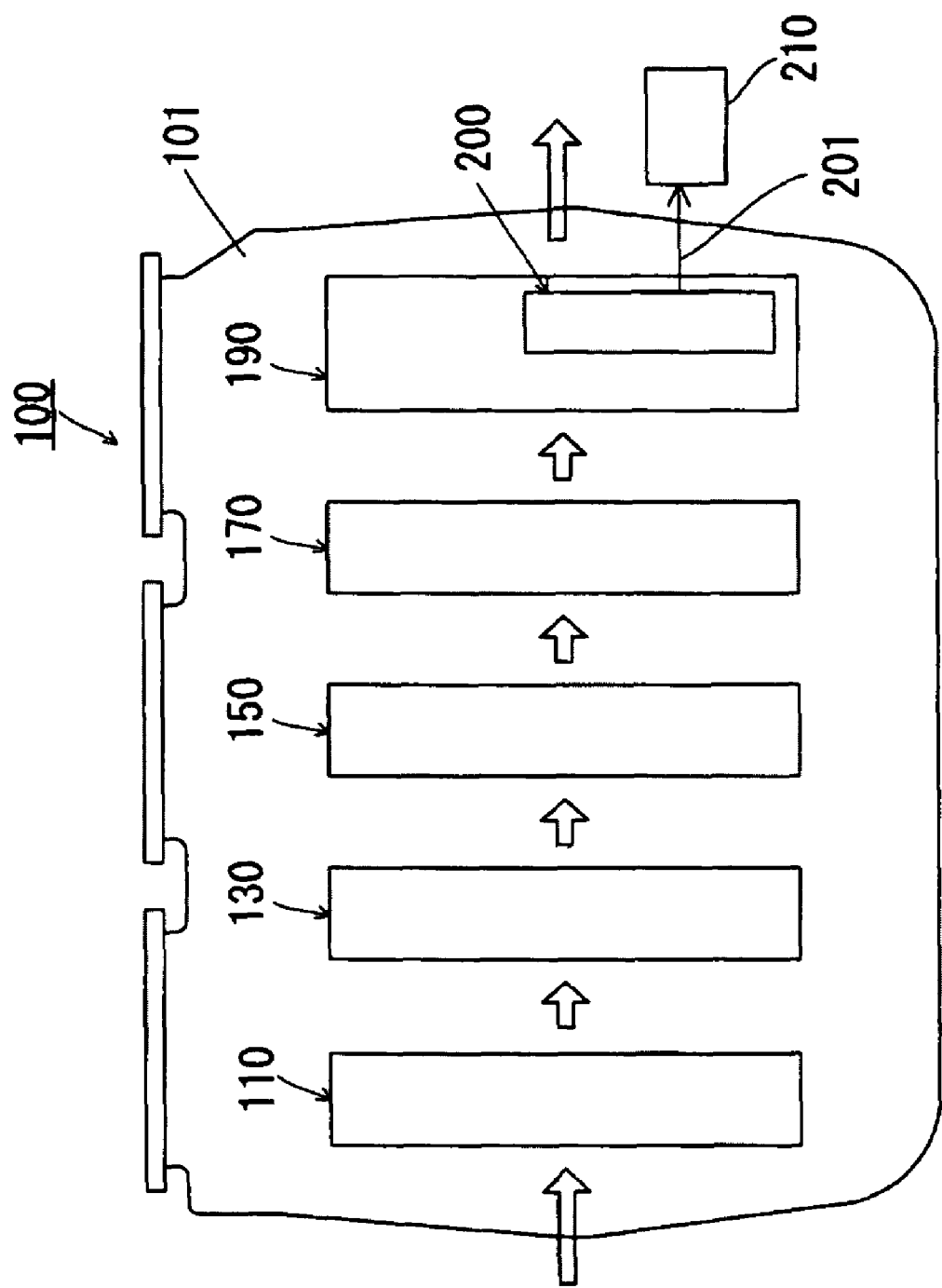
FIG. 1 shows a flow of water to be treated by a wastewater treatment apparatus 100 according to an embodiment of this invention.

FIG. 1 shows a flow of water to be treated by a representative wastewater treatment apparatus 100 embodied as an example of a water treatment apparatus of the invention.

As shown in FIG. 1, the wastewater treatment apparatus 100 of this embodiment has various purifying mechanisms within a tank body 101. Specifically, the tank body 101 houses, from the upstream side (left to right as viewed in FIG. 1) in order of the treatment procedures, a foreign matter removing tank 110, an anaerobic filter bed tank 130, a contact filter bed tank 150, a treated water tank 170 and a sterilizing chamber 190. Wastewater flows into the tank body 101 and is purified within the foreign matter removing tank 110, the anaerobic filter bed tank 130, the contact filter bed tank 150, the treated water tank 170 and the sterilizing chamber 190 successively. Thereafter, the treated water is discharged to the outside of the tank body 101. In this embodiment, the "water to be treated" or "water" includes wastewater to be treated in each tank and water that flows in the process of treating the wastewater.

Foreign matter removing tank 110 is disposed in the most upstream portion of the tank body 101. Water to be treated flows into the foreign matter removing tank 110 through an inlet (not shown). Foreign matter in the water is separated from the water in the foreign matter removing tank 110 by means of a solid-liquid separating device such as an inflow baffle (not shown). The foreign matter removing tank 110 has a function of separating solid from liquid in the water to be treated. The water that has been treated in this foreign matter removing tank 110 is then transferred to the anaerobic filter bed tank 130 disposed downstream of the foreign matter removing tank 110.

Anaerobic filter bed tank 130 has a function of anaerobically treating (reducing) organic pollutant in the water to be treated. Typically, the anaerobic filter bed tank 130 is configured to have a filter bed packed with a predetermined amount of filter media. Anaerobic microbes are deposited on the filter media and anaerobically treat (reduce) organic pollutant in the water. Reduction of BOD and weight reduction of sludge can be attained by this anaerobic treatment. The treated water is thereafter transferred to the contact filter bed tank 150 disposed downstream of the anaerobic filter bed tank 130.

Contact filter bed tank 150 has a function of aerobically treating and filtering the water. The water that has been treated in this contact filter bed tank 150 is transferred to the treated water tank 170.

Treated water tank 170 has a function of temporally storing the water to be led into the sterilizing chamber 190. The water that has been temporally stored in the treated water tank 170 is thereafter transferred to the sterilizing chamber 190.

Sterilizing chamber 190 has a function of sterilizing the water that has been led from the treated water tank 170. The sterilizing chamber 190 is positioned in the most downstream portion within the tank body 101. The sterilizing chamber 190 has a chemical cartridge (not shown) filled with an antiseptic (solid chlorinating agent). The water that has been sterilized in this sterilizing chamber 190 is discharged to the outside of the tank body 101. Specifically, the sterilizing chamber 190 has a function of sterilizing water before discharged and a function of storing the sterilized water before discharged. The sterilizing chamber 190 is a feature that corresponds to the "sterilizing section" and the "water storing section" in this invention. Further, the foreign matter removing tank 110, the anaerobic filter bed tank 130, the contact filter bed tank 150 and the treated water tank 170 form the "purifying section" according to the invention.

In this embodiment, a water quality detection sensor 200 is disposed within the sterilizing chamber 190. The water quality detection sensor 200 detects the quality of sterilized water. The water quality detection sensor 200 typically comprises a turbidity measurement sensor or transparency measurement sensor employing a transmitted light system utilizing red light or near infrared radiation, or a scattered light system utilizing red light or near infrared radiation, in order to detect the turbidity or transparency of the sterilized water.

Further, in this embodiment, water that has been purified upstream of the sterilizing chamber 190 is sterilized in the sterilizing chamber 190, so that deposition of biomembrane on the water quality detection sensor 200 can be reduced. With this construction, it can be made possible to prevent biomembrane deposition on the detecting section from inhibiting accurate water quality detection. The water quality detection sensor 200 of this embodiment can be appropriately selected between a type with a washing function such as a wiper and a type without a washing function in consideration of the water quality within the sterilizing chamber 190.

Further, if the influence of the sterilizing treatment is considered, preferably, a sensor housing of the water quality detection sensor 200 comprises corrosion-resistant SUS or resin material.

The data detected by the water quality detection sensor 200 is outputted to an output section 210 by means of indication or voice. Specifically, an indicator or an alarm is installed on or around the water treatment apparatus 100. The indicator displays the data the alarm notifies that the water quality is not within the predetermined range of level if such occurs. Alternatively or in addition, the detected data of the water quality detection sensor 200 is appropriately transmitted by wire or radio channel to a data monitor (data management system) or data processor installed in a position remote from the water treatment apparatus 100.

Water turbidity or transparency is generally correlated with BOD (biochemical oxygen demand) and SS (suspended solids). In this embodiment, it is constructed such that quantitative or qualitative analysis of water quality can be performed in relation to BOD and SS by obtaining detected turbidity or transparency data. At this time, the water quality detection sensor 200 may be constructed such that the detected turbidity or transparency data itself is outputted as-is to the output section 210, or such that the detected turbidity or transparency data is converted into data relating to BOD or SS and the converted date is outputted to the output section 210.

Further, in this embodiment, the water quality detection sensor 200 is used to keep track of the sterilizing performance of the sterilizing chamber 190 as well as the water quality detection as mentioned above. If the sterilizing performance deteriorates, biomembrane will be deposited on the detecting section of the water quality detection sensor 200, resulting in that the detected value of the water quality detection sensor 200 falls outside the normal range. Therefore, by monitoring the detected data, it can be found that the sterilizing performance has deteriorated, for example, due to the fact that the chlorinating agent has run out. Thus, the water quality detection sensor 200 of this embodiment not only serves as a means for detecting the quality of water of the sterilizing chamber 190, but also as a means for detecting that biomembrane has been deposited on the detecting section of the water quality detection sensor 200 due to deterioration of the sterilizing performance of the sterilizing chamber 190. Further, a method of controlling the water quality using the water quality detection sensor 200 of this embodiment includes a step of detecting the quality of sterilized water to be discharged from the sterilizing chamber 190 to the outside of the water treatment apparatus 100, and a step of detecting that biomembrane has been deposited on the detecting section of the water quality detection sensor 200 due to deterioration of the sterilizing performance of the sterilizing chamber 190.

Specific manners of installation of the water quality detection sensor 200 having the above-mentioned construction will now be explained with reference to FIGS. 2 to 7.

In this embodiment, the water quality detection sensor 200 is disposed such that the detecting section is always immersed in the storing region of the sterilizing chamber 190. At this time, in order to detect the standard quality of sterilized water with high accuracy, in consideration of precipitated sludge that is precipitated in the tank bottom, or suspended sludge that is suspended in the water surface in the tank top, preferably, the detecting section (an emitter and a receiver) of the water quality detection sensor 200 is disposed between the precipitated sludge region and the suspended sludge region within the storing region of the sterilizing chamber 190 in its vertical direction. With this construction, influence of precipitated sludge and suspended sludge on the water quality detection (measurement) of the water quality detection sensor 200 can be avoided. Thus, the standard quality of sterilized water can be detected with stability and high accuracy.

More specifically, the detecting section of the water quality detection sensor 200 is disposed between a first reference position defined as a position at a first predetermined distance upward from the bottom of the sterilizing chamber 190 and a second reference position defined as a position at a second predetermined distance downward from the water surface of the sterilizing chamber 190. The first predetermined distance is specified allowing for the precipitation height of the precipitated sludge that is precipitated in the tank bottom, in order to prevent the detecting section of the water quality detection sensor 200 from being buried in the precipitated sludge. The second predetermined distance is specified allowing for the thickness of the suspended sludge, dead insects or other similar suspended matter that is suspended in the region of the water surface, in order to prevent the detecting section of the water quality detection sensor 200 from interfering with suspended matter. In this manner, influence of the precipitated sludge and the suspended sludge on the water quality detection (measurement) can be avoided, so that improved data detection can be achieved.

Figure 2:
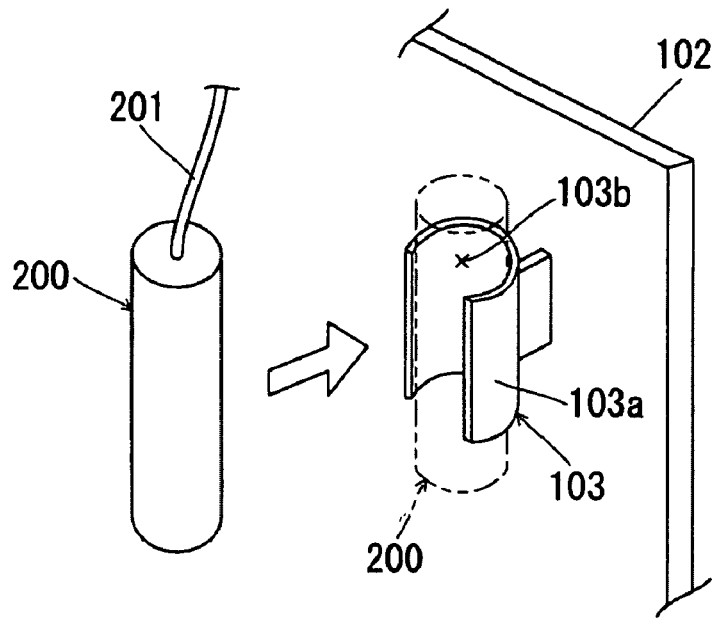
FIG. 2 shows a first manner of installation of a water quality detection sensor 200 in this embodiment.

FIG. 2 shows a first manner of installation of the water quality detection sensor 200 in this embodiment. In the first installation manner shown in FIG. 2, a claw-shaped arm 103 is provided on a structural wall 102 within the sterilizing chamber 190 in the tank body 101. The arm 103 includes a holding arm piece 103a that can hold the water quality detection sensor 200. Specifically, the arm piece 103a has an interior diameter slightly smaller than the outer diameter of the water quality detection sensor 200 as shown in the cylindrical form. The vertically extending water quality detection sensor 200 is inserted through a side opening of the arm piece 103a into a receiving portion 103b that is defined in the inside of the arm piece 103a. At this time, the arm piece 103a is slightly expanded and the water quality detection sensor 200 is locked and held on the wall 102 by the holding force of the arm piece 103a. In this state, the cylindrical water quality detection sensor 200 extends vertically. The arm piece 103a may be integrally formed with the wall 102, or separately formed in advance and secured to the wall 102.

Figure 3:
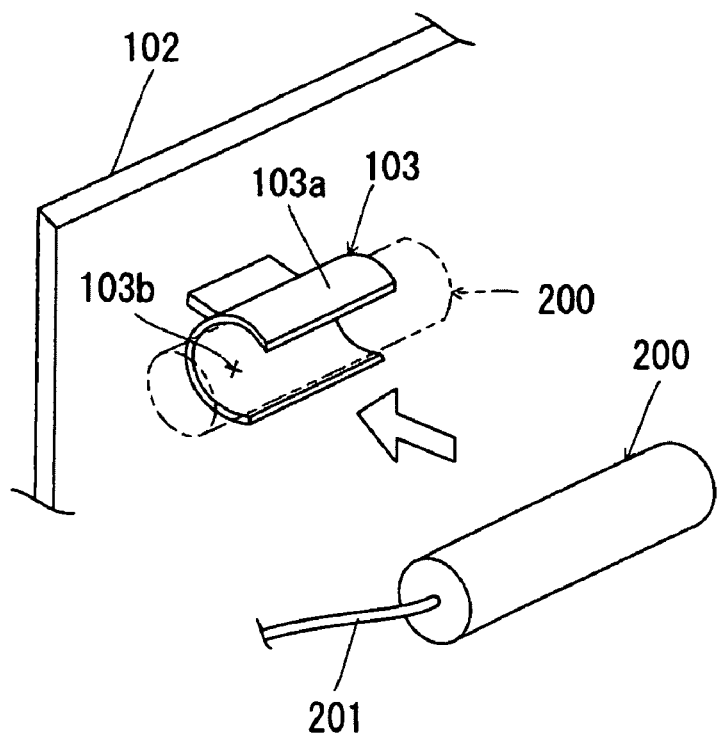
FIG. 3 shows a second manner of installation of the water quality detection sensor 200 in this embodiment.

FIG. 3 shows a second manner of installation of the water quality detection sensor 200 in this embodiment. In the second installation manner shown in FIG. 3, the arm 103 is provided on the structural wall 102 in an orientation that is rotated 90° from the orientation of the first installation manner. The horizontally extending water quality detection sensor 200 is inserted through the side opening of the holding arm piece 103a into the receiving portion 103b that is defined in the inside of the arm piece 103a. At this time, the arm piece 103a is slightly expanded and the water quality detection sensor 200 is locked and held on the wall 102 by the holding force of the arm piece 103a. In this state, the cylindrical water quality detection sensor 200 extends horizontally.

Figure 4:
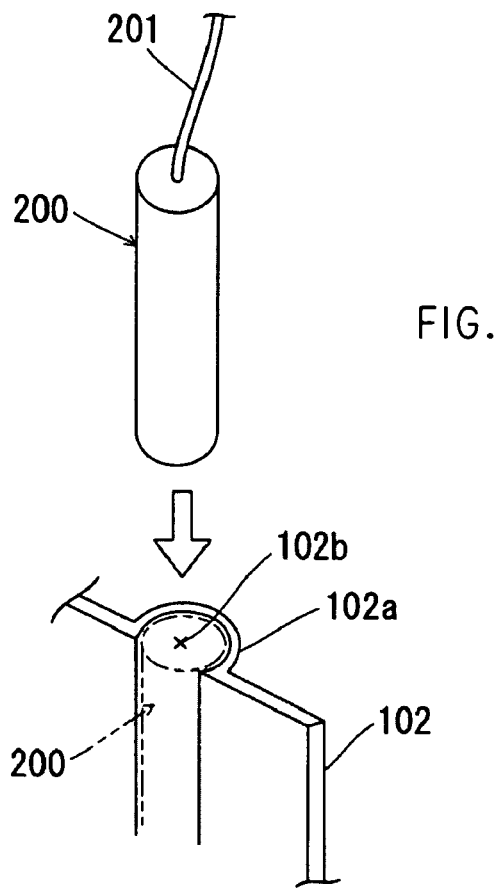
FIG. 4 shows a third manner of installation of the water quality detection sensor 200 in this embodiment.

Further, FIG. 4 shows a third manner of installation of the water quality detection sensor 200 according to the embodiment. In the third installation manner as shown in FIG. 4, the structural wall 102 within the sterilizing chamber 190 of the tank body 101 is formed in such a manner as to provide a holding portion 102a. The holding portion 102a holds the water quality detection sensor 200. Specifically, the holding portion 102a has an interior diameter slightly smaller than the outer diameter of the water quality detection sensor 200 which is shown in the cylindrical form. The vertically extending water quality detection sensor 200 is inserted through the side opening of the holding portion 102a into a receiving portion 102b defined in the inside of the holding portion 102a. At this time, the holding portion 102a is slightly expanded and the water quality detection sensor 200 is locked and held on the wall 102 by the holding force of the holding portion 102a. In this state, the cylindrical water quality detection sensor 200 extends vertically.

Figure 5:
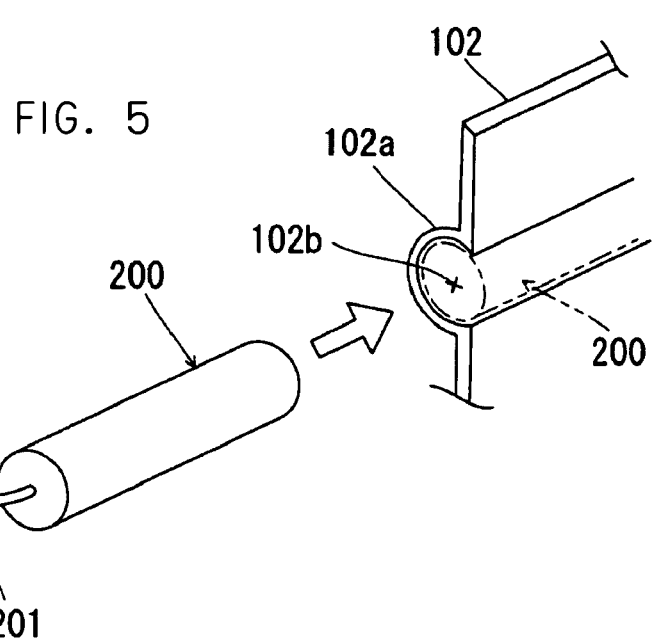
FIG. 5 shows a fourth manner of installation of the water quality detection sensor 200 in this embodiment.

Further, FIG. 5 shows a fourth manner of installation of the water quality detection sensor 200 according to the embodiment. In the fourth installation manner as shown in FIG. 5, the holding portion 102a is formed in the structural wall 102 in an orientation rotated 90° from the orientation of the third installation manner. The horizontally extending water quality detection sensor 200 is inserted through the side opening of the holding portion 102a into the receiving portion 102b defined in the inside of the holding portion 102a. At this time, the holding portion 102a is slightly expanded and the water quality detection sensor 200 is locked and held on the wall 102 by the holding force of the holding portion 102a. In this state, the cylindrical water quality detection sensor 200 extends horizontally.

Figure 6:
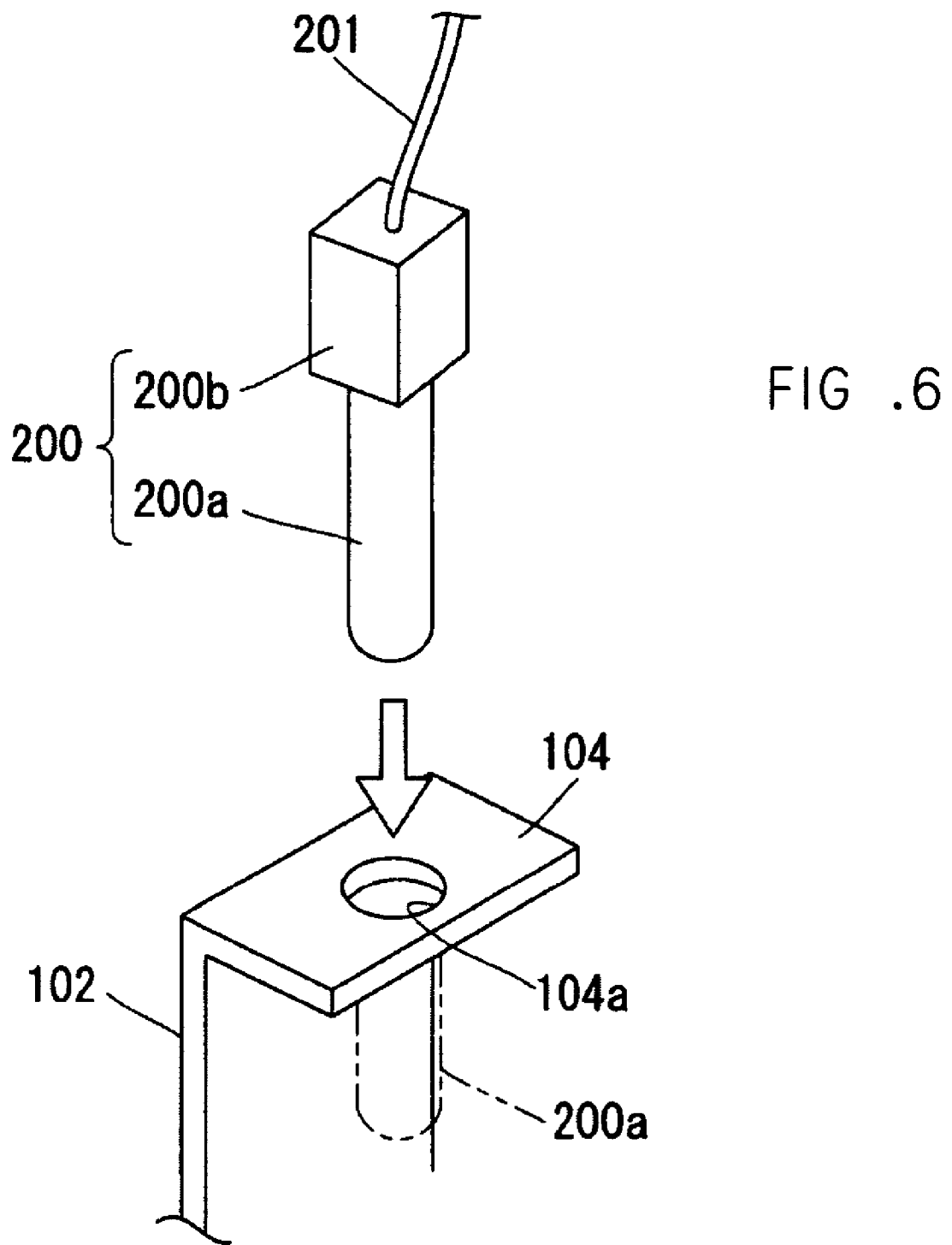
FIG. 6 shows a fifth manner of installation of the water quality detection sensor 200 in this embodiment.

FIG. 6 shows a fifth manner of installation of the water quality detection sensor 200 according to the embodiment. In the fifth installation manner as shown in FIG. 6, a horizontally extending plate-shaped portion 104 is provided on the structural wall 102 within the sterilizing chamber 190 of the tank body 101. An insertion hole 104a is formed in the plate-shaped portion 104 such that a detecting section 200a of the water quality detection sensor 200 is inserted through the insertion hole 104a. The vertically extending detecting section 200a of the water quality detection sensor 200 is inserted from above through the insertion hole 104a (as shown by phantom line in FIG. 6). In this state, a body 202b of the water quality detection sensor 200 connected to the detecting section 200a rests on the plate-shaped portion 104. Thus, the water quality detection sensor 200 is locked and held on the wall 102. In this state, the cylindrical water quality detection sensor 200 extends vertically.

Figure 7:
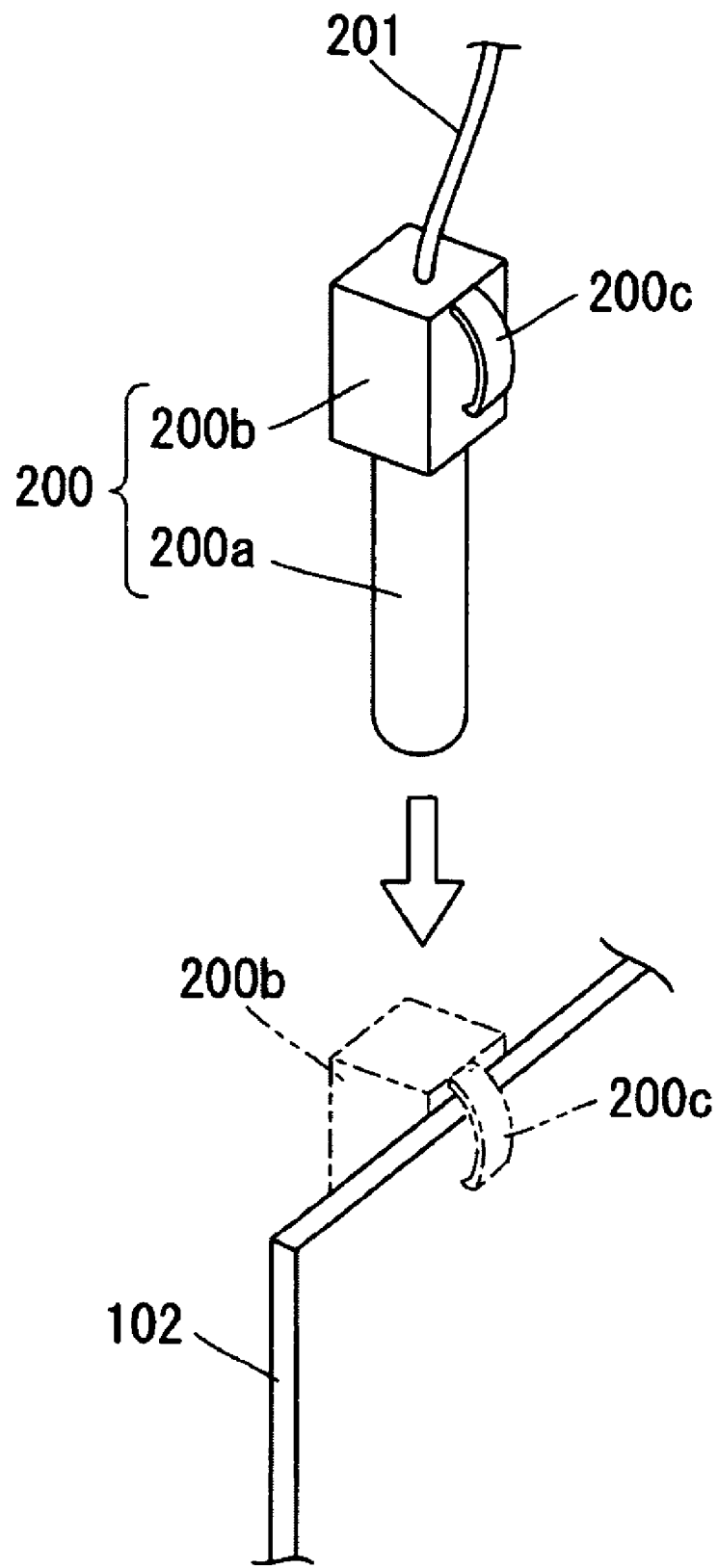
FIG. 7 shows a sixth manner of installation of the water quality detection sensor 200 in this embodiment.

Further, FIG. 7 shows a sixth manner of installation of the water quality detection sensor 200 according to the embodiment. In the sixth installation manner as shown in FIG. 7, a claw-shaped hook 200c is provided on the body 200b of the water quality detection sensor 200 such that the water quality detection sensor 200 is hooked on the structural wall 102 by using the hook 200c. The hook 200c of the vertically extending water quality detection sensor 200 is engaged from above with the wall 102 (as shown by phantom line in FIG. 7), so that the water quality detection sensor 200 is locked and held on the wall 102. In this state, the cylindrical water quality detection sensor 200 extends vertically.

According to the above-mentioned respective installation manners, the water quality detection sensor 200 can be readily and reliably installed on the structural wall 102. The water quality detection sensor 200 can be prevented from being displaced by external force such as water flow. Further, with the construction in which the water quality detection sensor 200 is fixed, excessive tension on a cable 201 is prevented. Therefore, the conditions of water quality detection are stabilized so that the reliability of the detected values (measured values) can be improved. Particularly, with the construction in which the structural wall 102 is formed in such a manner as to provide the holding structure of the water quality detection sensor 200 like in the third and fourth installation manners as shown in FIGS. 4 and 5, the manufacturing costs can be reduced. Further, with the construction in which the water quality detection sensor 200 is installed horizontally like in the second and fourth installation manners as shown in FIGS. 3 and 5, stable measurement can be achieved.

The water quality detection sensor 200 is installed in the above-mentioned installation manners shown in FIGS. 2 to 7 and detects the quality of water that has been sterilized in the sterilizing chamber 190 before discharged to the outside of the tank body 101, continuously or at fixed time intervals.

According to such constructions and methods, biomembrane deposition on the water quality detection sensor 200 can be reduced by the improved manners of installation of the water quality detection sensor 200 in the water treatment apparatus 100. Thus, the comprehensive quality of water to be discharged to the outside of the tank body 101 as well as water within the tank body 101 can be accurately and constantly monitored. Particularly, as for water treatment apparatus for treating domestic wastewater, maintenance is less frequently performed compared with those for industrial use. It is therefore highly desired to monitor the water quality until the next maintenance is performed. Therefore, by adapting the construction in which the water quality detection sensor 200 constantly monitors the quality of water before discharged to the outside of the tank body 101, it is made possible to keep track of the treatment performance of the wastewater treatment apparatus 100 and to promptly cope with deterioration of the treatment performance.

Further, as mentioned above, the water quality detection sensor 200 not only serves as a means for detecting the quality of water of the sterilizing chamber 190, but also as a means for detecting that biomembrane has been deposited on the detecting section of the water quality detection sensor 200 due to deterioration of the sterilizing performance of the sterilizing chamber 190. By thus using the water quality detection sensor 200 to monitor the water quality and the sterilizing performance in the water reservoir, water quality control can be efficiently achieved. Thus, in this embodiment, the water quality detection sensor 200 performs another advantageous function in addition to normal water quality control, serving to monitor the sterilizing performance by detecting biomembrane deposition as well as to simply monitor the water quality.

Preferably, the orientation of the water quality detection sensor 200 may be selected such that precipitated sludge is not easily precipitated on the detecting section. For example, the water quality detection sensor 200 may be installed in the orientation in which the surface of the detecting section extends vertically. Thus, the sludge precipitated downward in the water is not easily deposited on the detecting section, so that a stable measurement can be achieved with the water quality detection sensor 200.

Figure 8:
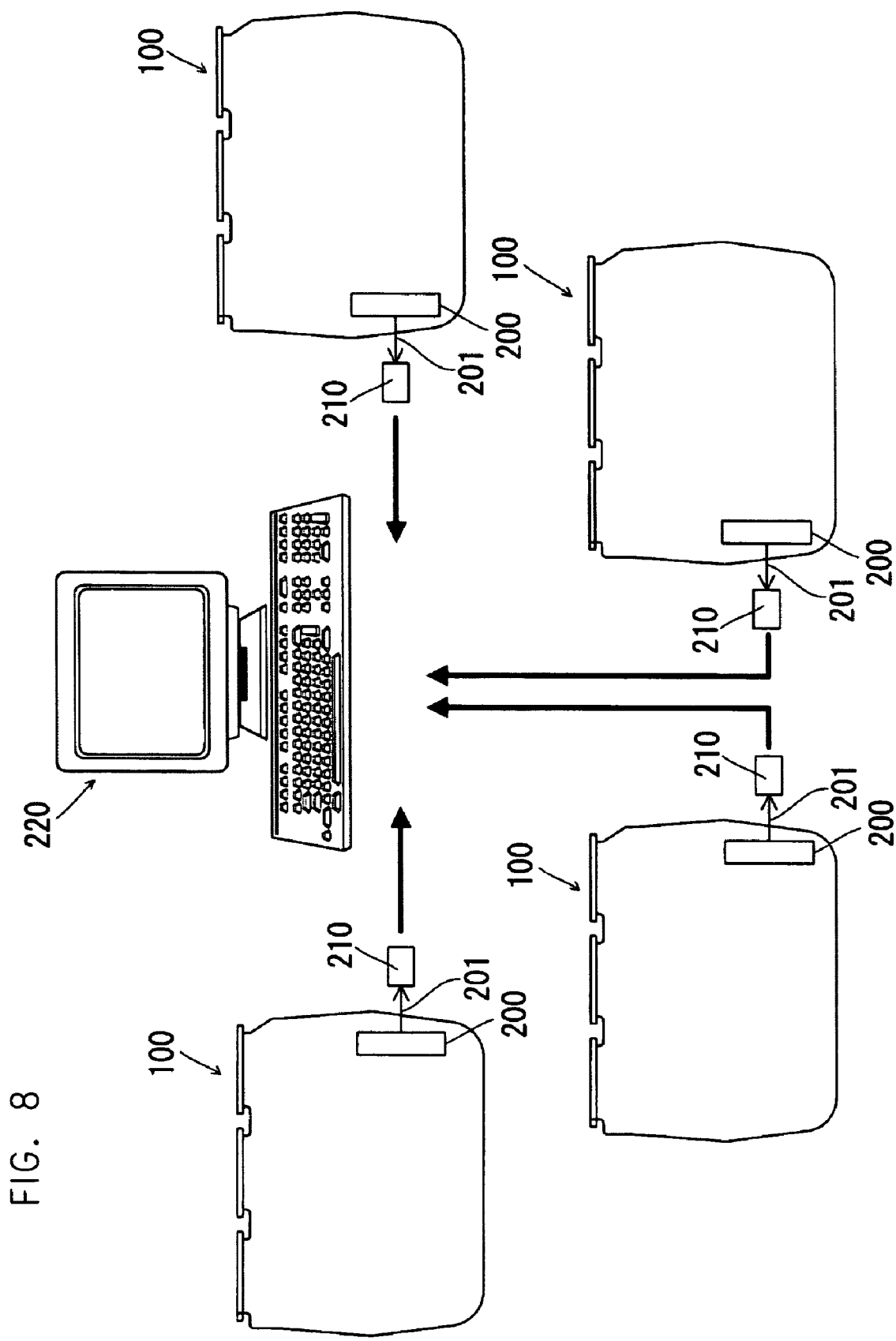
FIG. 8 shows a control system using the wastewater treatment apparatus 100 according to this embodiment.

FIG. 8 shows an example of a control system that utilizes the representative wastewater treatment apparatus 100. In the example as shown in FIG. 8, the data detected by the water quality detection sensors 200 of a plurality (four in FIG. 8) of the wastewater treatment apparatus 100 is transmitted by wire or radio channel (for example, on the Internet) to a control system 220 via the output section 210. With such construction, water quality control (water quality monitoring) of the plurality of the wastewater treatment apparatus can be centrally performed by using the control system 220. This system is particularly effective in water quality control (water quality monitoring) of widespread wastewater treatment apparatus, such as domestic wastewater treatment apparatus.

In the above-mentioned embodiment, the sterilizing chamber 190 is positioned in the most downstream portion within the tank body 101. However, a downstream treatment section such as a storage tank and a discharging pump tank may be additionally provided downstream of the sterilizing section such as the sterilizing chamber 190. In this case, in order to perform the water quality control using another water quality detection sensor like the water quality detection sensor 200, the water quality detection sensor is immersed in at least one of the sterilizing section and the downstream treatment section.

Further, in the above-mentioned embodiment, a solid chlorinating agent is used for sterilization of the sterilizing chamber 190. However, any other sterilizing methods such as ozone sterilization, UV (ultraviolet) sterilization and/or electrolytic sterilization may be appropriately adopted instead of chlorination.

Further, in the above-mentioned embodiment, the turbidity or transparency is detected as the water quality. However, in addition to or instead of the turbidity or transparency, the water quality can be detected in terms of SS, BOD, DO or pH.

Further, the above-mentioned embodiment is related to the wastewater treatment apparatus 100 having the foreign matter removing tank 110, the anaerobic filter bed tank 130, the contact filter bed tank 150, the treated water tank 170 and the sterilizing chamber 190 within the tank body 101. On the other hand, wastewater treatment apparatus may have a different construction, for example including a foreign matter removing tank, an anaerobic filter bed tank, a carrier fluidizing biofiltration tank, a treated water tank and a sterilizing chamber within the tank body. Further, the present invention can also be applied to various industrial wastewater treatment apparatus.

It is explicitly stated that all features disclosed in the description and/or the claims are intended to be disclosed separately and independently from each other for the purpose of original disclosure as well as for the purpose of restricting the claimed invention independent of the composition of the features in the embodiments and/or the claims. It is explicitly stated that all value ranges or indications of groups of entities disclose every possible intermediate value or intermediate entity for the purpose of original disclosure as well as for the purpose of restricting the claimed invention, in particular as limits of value ranges.

DESCRIPTION OF NUMERALS 100 wastewater treatment apparatus
101 tank body
102 structural wall
102a holding portion
102b receiving portion
103 arm
103a holding arm piece
103b receiving portion
104 plate-shaped portion
104a insertion hole
110 foreign matter removing tank
130 anaerobic filter bed tank
150 contact filter bed tank
170 treated water tank
190 sterilizing chamber
200 water quality detection sensor
200a detecting section
200b body
200c hook
201 cable

What we claim is:

1. A water treatment apparatus, comprising:
a purifying section that purifies water to be treated,
a sterilizing section that sterilizes the water treated in the purifying section,
a water storing section that stores the water treated in the sterilizing section, the sterilized water being discharged from the water storing section to the outside of the water treatment apparatus, the water storing section comprising the sterilizing section in part or in entirety, and
a water quality detection sensor that detects the water quality, the water quality detection sensor being disposed in the water storing section, wherein the water quality detection sensor detects the quality of the sterilized water to be discharged to the outside of the water treatment apparatus and also detects biomembrane deposited on a detecting section of the water quality detection sensor due to deterioration of the sterilizing performance of the water sterilizing section.

2. The water treatment apparatus as defined in claim 1, wherein the purifying section performs at least one of solid-liquid separation, anaerobical treatment, and aerobical treatment.

3. The water treatment apparatus as defined in claim 1, wherein sterilization of the sterilizing section comprises at least one of chlorination, ozone sterilization, ultraviolet sterilization and electrolytic sterilization.

4. The water treatment apparatus as defined in claim 1, wherein the water quality detection sensor optically detects the water quality by utilizing transparency or attenuation of light that goes through the water.

5. The water treatment apparatus as defined in claim 1, wherein the water quality detection sensor detects the data relating to at least one of turbidity, transparency, SS (suspended solids), BOD (biochemical oxygen demand), DO (dissolved oxygen), pH, and UV (ultraviolet) absorbance of the water, continuously or at fixed time intervals.

6. The water treatment apparatus as defined in claim 1, wherein the water quality detection sensor detects the water quality of the water storing section and also detects deposition of biomembrane on the detecting section of the water quality detection sensor due to deterioration of the sterilizing performance of the water sterilizing section.

7. The water treatment apparatus as defined in claim 1, wherein the water storing section further comprises a storage tank that stores the water treated in the sterilizing section, a first reference position at a first predetermined distance upward from the bottom of the storage tank, and a second reference position at a second predetermined distance downward from the water surface of the storage tank, wherein the water quality detection sensor is disposed between the first reference position and the second reference position.

8. The water treatment apparatus as defined in claim 7, wherein the first predetermined distance is specified allowing for the precipitation height of precipitated sludge precipitated in the tank bottom so as to prevent the detecting section of the water quality detection sensor from being buried in the precipitated sludge, and the second predetermined distance is specified allowing for the thickness of suspended sludge, dead insects or other similar suspended matter suspended in the region of the water surface so as to prevent the detecting section of the water quality detection sensor from interfering with the suspended matter, whereby influence of the precipitated sludge and the suspended matter on water quality detection is avoided.

9. The water treatment apparatus as defined in claim 1, wherein the water storing section includes a storage tank body, a structural wall of the storage tank body, a claw-shaped arm on the structural wall, and a holding arm piece provided in the arm to hold the water quality detection sensor, and wherein the water quality detection sensor is held with the holding arm piece in a vertical or horizontal orientation within the water storing section.

10. The water treatment apparatus as defined in claim 9, wherein the arm is integrally formed with the storage tank body, or separately formed in advance and secured to the storage tank body.

11. The water treatment apparatus as defined in claim 1, wherein the water storing section includes a storage tank body, a structural wall of the storage tank body and a holding portion to hold the water quality detection sensor, the holding portion being integrally formed with the structural wall and having a cylindrically recessed form, and wherein the water quality detection sensor has a cylindrical shape complementary to the cylindrically recessed form of the holding portion and is inserted into the holding portion and held in a vertical or horizontal orientation within the water storing section.

12. The water treatment apparatus as defined in claim 1, wherein the water storing section includes a storage tank body, a structural wall of the storage tank body, a horizontally extending plate-shaped portion provided on the structural wall, and an insertion hole formed in the plate-shaped portion, and wherein the water quality detection sensor is inserted through the insertion hole and held in a vertical orientation within the water storing section.

13. The water treatment apparatus as defined in claim 1, wherein the water quality detection sensor has a claw-shaped hook and is hooked on the water treatment apparatus by using the hook.

14. The water treatment apparatus as defined in claim 1, further comprising a cable that is connected to the water quality detection sensor and transmits the detected data of the water quality, wherein the water quality detection sensor is secured to the water treatment apparatus, thereby preventing excessive tension on the cable.

15. The water treatment apparatus as defined in claim 1, wherein the water quality detection sensor has an emitter and a receiver to detect the water quality and is installed in an orientation in which precipitated sludge within the water storing section is prevented from being precipitated on the emitter and the receiver.

16. The water treatment apparatus as defined in claim 1, wherein a storage tank and/or a discharging pump tank is disposed downstream of the water storing section, and the water quality detection sensor is immersed in at least one of the storage tank and the discharging pump tank.

17. The water treatment apparatus as defined in claim 1, wherein the water quality detection sensor is disposed between a region of precipitated sludge and a region of the suspended sludge within the water storing section in the vertical direction.

18. A method of controlling water quality in a water treatment apparatus including a purifying section for purifying water to be treated, a sterilizing section for sterilizing the water treated in the purifying section, a water storing section for storing the water treated in the sterilizing section, the water storing section comprising the sterilizing section in part or in entirety, the sterilized water being discharged from the water storing section to the outside of the water treatment apparatus, comprising the steps of:

immersing a water quality detection sensor and detecting the quality of sterilized water to be discharged to the outside of the water treatment apparatus, by using the water quality detection sensor, and determining deposition of biomembrane on a detecting section of the water quality detection sensor due to deterioration of the sterilizing performance of the water sterilizing section.

* * * * *